United States Patent [19]
Wagner

[11] Patent Number: 5,100,104
[45] Date of Patent: Mar. 31, 1992

[54] IMPLEMENT FOR REMOVING A FENCE POST OR THE LIKE

[76] Inventor: Ralph A. Wagner, 5648 S. 75W, Ferdinand, Ind. 47532-9427

[21] Appl. No.: 653,137

[22] Filed: Feb. 11, 1991

[51] Int. Cl.⁵ .............................................. E21B 19/00
[52] U.S. Cl. ...................................... 254/30; 254/123; 254/131
[58] Field of Search .................. 254/30, 120, 123, 124, 254/131, 133 R

[56] References Cited

U.S. PATENT DOCUMENTS

| | | | |
|---|---|---|---|
| 1,153,024 | 9/1915 | Brown | 254/30 |
| 2,341,106 | 2/1944 | Kuzela | 254/30 |
| 2,826,392 | 3/1958 | Kohorst | 254/30 |
| 2,994,510 | 8/1961 | Michalak | 254/30 |
| 3,848,850 | 11/1974 | Bennis | 254/30 |

Primary Examiner—J. J. Hartman
Attorney, Agent, or Firm—Warren D. Flackbert

[57] ABSTRACT

An implement for removing a tree stump or the like defined by a first portion directly engaging the article under removal in a biting relationship and a second portion partly surrounding the article and moving into a confining relationship with the latter. The implement is mounted on a framework for pivotal movement. A manually controlled mechanism defines a removal location by pivotal action and where a locking bar serves to maintain the latter. Ample leverage is afforded for ready one-man operation.

5 Claims, 1 Drawing Sheet

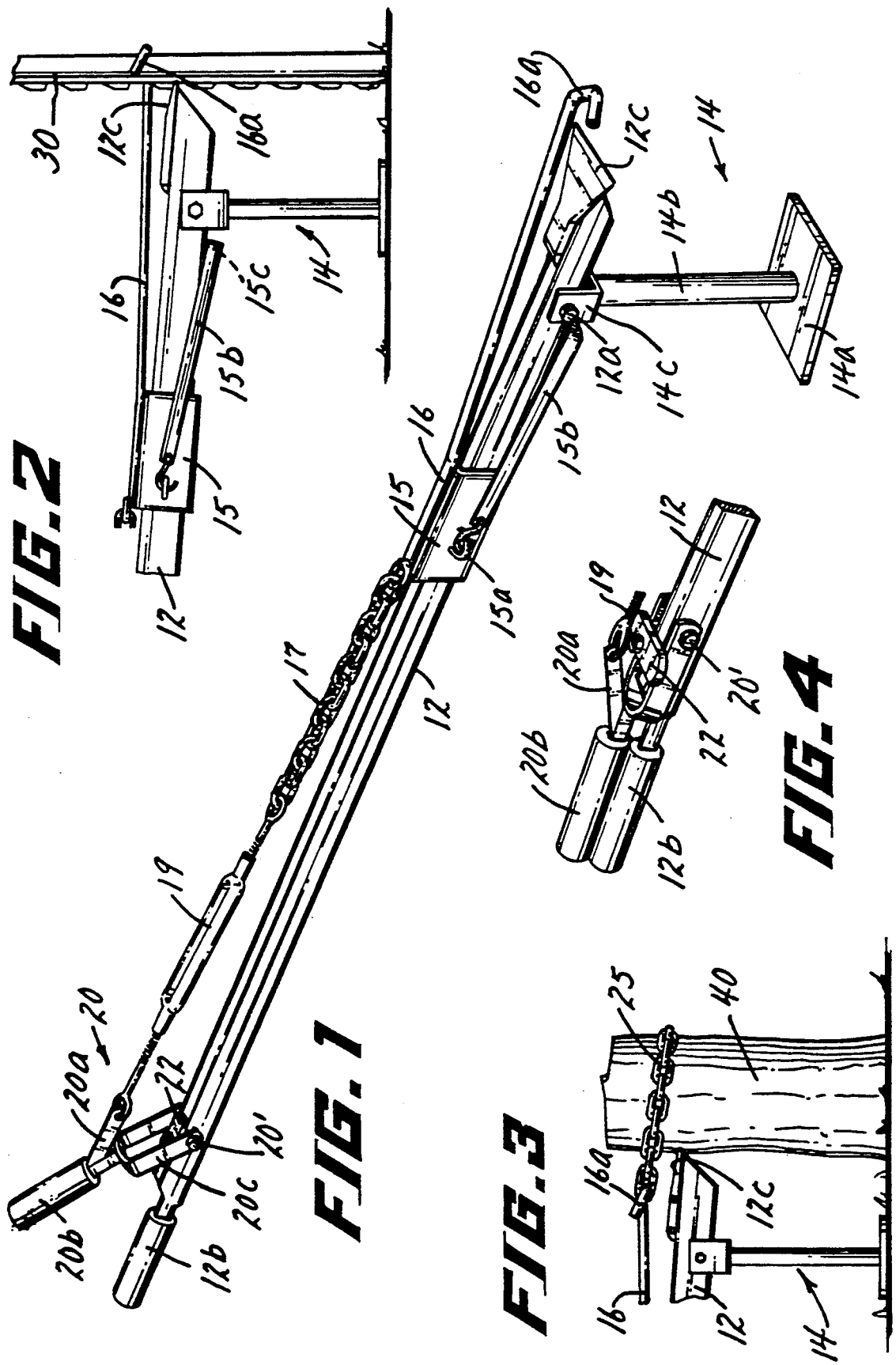

IMPLEMENT FOR REMOVING A FENCE POST OR THE LIKE

BACKGROUND OF THE INVENTION

As is known, a need continually exists, particularly around a farm or in rural areas, for the ready removal of a tree stump, a fence post or any ground embedded upstanding article. Equipment in use heretofore is generally cumbersome in size, presenting difficulty and/or awkwardness in placement for the removal activity, or, by way of further example, requires more than a single operator to achieve the desired result.

SUMMARY OF THE INVENTION

A need has arisen, therefore, for providing an implement which is readily movable to an operational site, which achieves positive placement with respect to the article under removal, and which accomplishes the desired lifting action through simple pivotal movement of the control mechanism.

DESCRIPTION OF THE DRAWINGS

In any event, a better understanding of the present invention will become more apparent from the following description, taken in conjunction with the accompanying drawings, wherein FIG. 1 is a perspective view of a removal implement in accordance with the teachings of the present invention;

FIG. 2 is a view in side elevation, partly fragmentary, showing the invention at a use position for fence post removal;

FIG. 3 is another view in side elevation, partly fragmentary, showing the invention at a use position for tree stump removal; and, FIG. 4 is a detailed perspective view detailing the operating and/or control mechanism for the implement.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENT

Referring to FIG. 1, the removal implement of the invention is disclosed as an elongated frame member 12 pivotally mounted, at 12a, on a stand 14, where the latter includes a surface engaging base 14a, an upstanding column 14b, and a clevis 14c through which the aforesaid pivot mount 12a extends.

The elongated frame member 12 has a handle 12b at its outer end and, typically, a chisel 12c at its opposite end, where the latter is adapted to engage the article under removal, as a fence post 30 (FIG. 2) or a tree stump 40 (FIG. 3).

A slide 15, movable along frame member 12, serves to minimize rearward movement of a grab bar 16 secured to the upper surface thereof through an arrangement which includes a hook 15a, welded to a side surface of the slide 15, and a resilient member, such as a tarp strap 15b, secured to a pin member 15c extending downwardly from the bottom surface of the elongated frame member 12, and, additionally, to assist in the release of the grab bar 16 after control mechanism 20 release (to be discussed more fully herebelow).

A grab bar 16 presents, at its outer free end, a hook 16a, preferably slightly bent in an upward direction. The other end of the slide 15, i.e. that closest to the operator, receives a chain 17 connecting to an adjustable turnbuckle 19, where the latter is selectively received in one of several openings (not numbered), to further adjustment, on an arm 20a extending forwardly and downwardly from the pivotally manual operated control mechanism 20.

Control mechanism 20 includes, apart from a hand gripping portion 20b, a bifurcated mounting assembly 20c which secures the control mechanism 20, at a pivot axis 20', to the elongated frame member 12 and in a location proximate the handle 12b of the latter. At a use condition, and with particular reference to FIG. 4, the handle portions of 20b, 12b of control mechanism 20 and the elongated frame member 12 are at an abutting relationship.

In order to minimize the movement of control mechanism 20, i.e. to lessen travel, a rotatable lock 22, as a plate, is provided on the upper surface of elongated frame member 12, and movable from an open position during tension adjustment of grab bar 16 (FIG. 1) to a closed or locking position during operation (FIG. 4).

As evident in FIG. 2, and when the implement is used to remove the fence post 30, for example, the chisel 12c is positioned beneath one of a series of projections 30a on one surface of the fence post 30. With pivotal movement of the control mechanism 20 in a downward direction, the fence post 30 is in positive engagement by both the chisel 12c and the hook 16a (which has moved into a partially engaging relationship with the rear surface of fence post 30).

Thereafter, as the elongated frame member 12 is caused to pivot, the fence post 30 is moved upwardly from its embedded position in the supporting ground surface. In other words, the invention first serves to clamp or otherwise grasp the fence post 30, eliminating or, at least, minimizing the possibility of any slipping as the elongated frame member 12 pivots, and moving the chisel 12c (and fence post 30) upwardly.

FIG. 3 illustrates the invention in connection with tree stump 40 removal, and the procedure described above in connection with fence post 30 removal (FIG. 2) is appropriate. In this connection, however, the hook 16a at the end of grab bar 16 receives a chain 25 which encircles the tree stump 40 and chisel 12c digs into the latter. At this time, tree stump 40 is firmly grasped for removal.

Note that in either FIG. 2 or FIG. 3, and when control mechanism 20 is pivoted to a non-use position, the slide 16, urged outwardly on elongated frame member 12, also serves movement of grab bar 16, and, thereby, a desired release function of hook 16a from engagement with either the fence post 30 or the tree stump 40.

As should be evident, therefore, the invention provides a readily usable implement for the removal of a tree stump or the like. More specifically, two applied forces serve to confine the article under removal, i.e. the force applied by the chisel member and the force applied by the hook at the end of the grab bar (or the chain combining with the latter). Maximum leverage is provided and, as well, the opportunity for use by a single operator located at one position adjacent the implement.

The removal implement of the invention is susceptible to various changes within the spirit of the invention including, by way of example, proportioning; the precise configuration of the chisel on the end of the grab bar; the mechanism for controlling and/or limiting the movement of the slide on which the grab bar is mounted; and, the like. Thus, the preceding should be considered illustrative and not as limiting the scope of the following claims:

I claim:

1. An implement for removing an upstanding surface embedded article comprising a generally horizontal elongated frame member having a handle end and a forward end said forward end having a means for selectively engaging the article under removal, a grab bar slidably mounted on said elongated frame member and including a hooked end portion which encircles a portion of said article, a control arrangement at the handle end of said elongated frame member for selectively and linearly drawing said hooked end portion on said grab bar into operative engagement with said article, thereby clamping the article between the hook and the means for selectively engaging, adjustment means on the control arrangement for changing the distance between the hook and the means for selectively engaging before actuation of the control arrangement, and framework pivotally supporting said elongated frame member, where means interconnecting said control arrangement and said grab bar selectively tension the latter.

2. The implement of claim 1 wherein said control arrangement pivots to achieve said operative clamping engagement.

3. The implement of claim 2 wherein means on said elongated frame member serves to lock said control arrangement at said clamping engagement.

4. The implement of claim 1 including means encircling said article, and where said hooked end portion of said grab bar connects to said means encircling said article instead of encircling a portion of said article itself.

5. The implement of claim 4 where said means encircling said article is a chain.

* * * * *